United States Patent Office 3,540,189
Patented Nov. 17, 1970

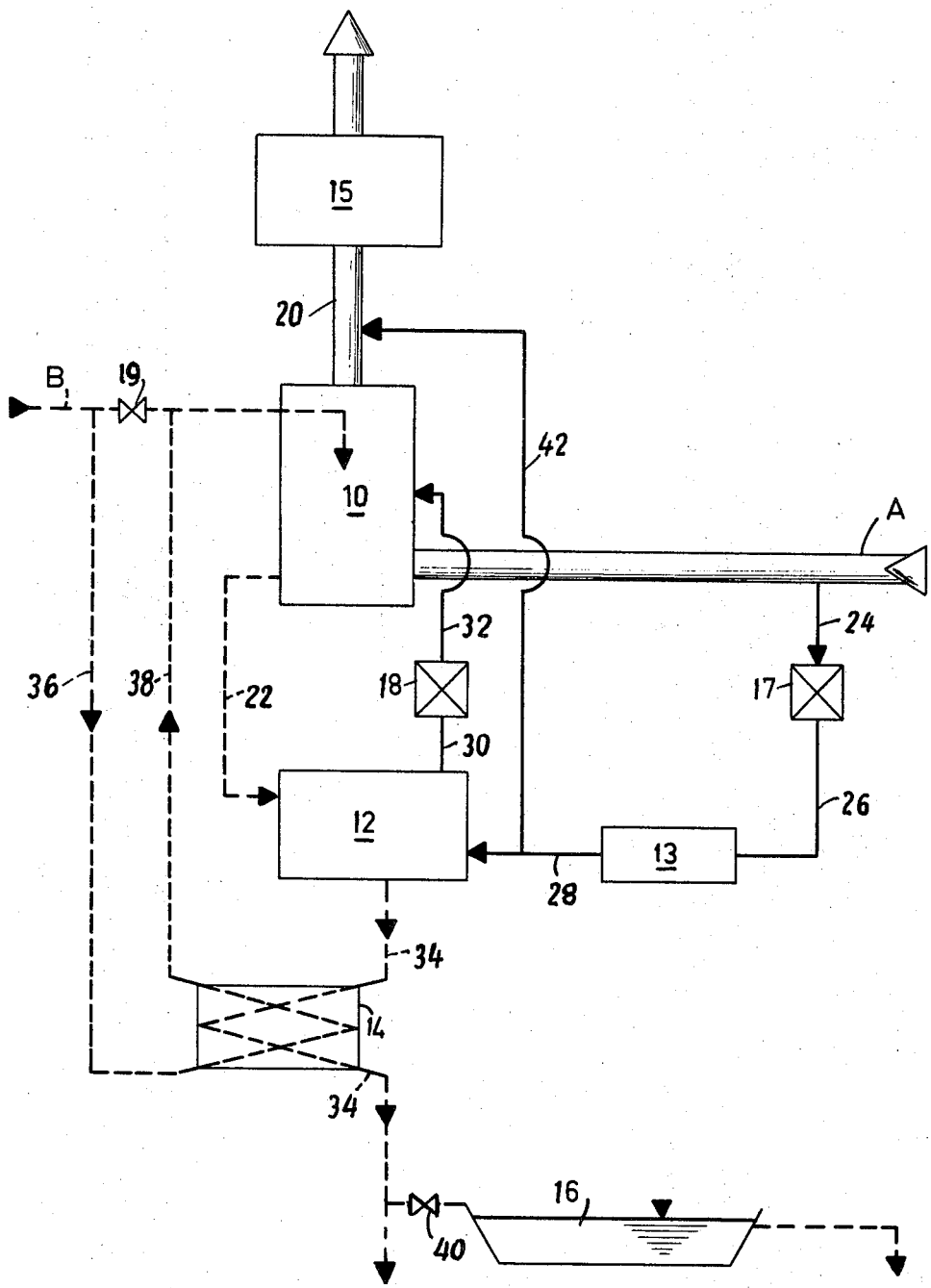

3,540,189
PROCESS FOR DESTROYING AMMONIA CONTAINED IN WATERS RESULTING FROM THE OPERATION OF COKE OVENS
Hermann Siewers, Schulstrasse 28, Schaffhausen (Saar), Germany; Karlheinz Flasche, Werbelnerstrasse 2, Differten (Saar), Germany; and Alfred Stetter, Freiligrathstrasse 17, and Siegfried Pfeiff, Parkhausweg 35, both of Volklingen (Saar), Germany
Filed Apr. 26, 1968, Ser. No. 724,502
Claims priority, application Germany, Apr. 27, 1967, R 45,889
Int. Cl. B01d 19/00
U.S. Cl. 55—46　　　　　　　　　　　　　　6 Claims

ABSTRACT OF THE DISCLOSURE

Process for destroying ammonia contained in waters resulting from the operation of coke ovens based on the principle of expelling the gas from the water, which comprises heating the water to be treated, with lean gas at an elevated temperature of such a degree that the temperature of the water after treatment thereof is at least 60° C., conveying the lean gas charged with ammonia to regenerators of industrial furnaces, and heating the same therein to such a temperature that the ammonia will become dissociated to nitrogen and hydrogen.

By this treatment, ammonia and other harmful gases will be completely eliminated from the waters which are then safe for discharge into the sewers.

SUMMARY OF THE INVENTION

The present invention relates to a process for removing ammonia from coke oven gas where it is formed during the degasification of coal; the removal is necessary in order to prevent the gas pipes from becoming corroded and, furthermore, in order to avoid formation of nitrogen oxides in the smoke upon combustion of coke gas. The condensates formed in the gas cooling units of coke-oven plants livewise contain ammonia and other harmful substances; they must, however, not be discharged into the drains, since according to existing regulations waste waters must be practically free of ammonia, hydrogen sulfide and other harmful products.

As a rule, cove-oven plants disposes of the ammonia contained in the gas and in the condensates (called coal water) by converting the same into ammonium sulfate. However, that is no longer profitable today, so that the plants sustain greater or smaller losses in the production of ammonium sulfate. The production of other ammonium salts or concentrated ammonia is likewise not economical, for various reasons, and it is therefore no longer in use.

As a consequence, many attempts have been made over the years to find a process for converting the ammonia from this source in a more profitable manner than by the conventional methods. In the indirect byproduct recovery process, both the condensates containing ammonia as well as the wash waters obtained in the ammonia washing process are further treated; in the semi-direct recovery process, only the condensates have to be worked up.

Thus, a process is known according to which clouds of ammonia resulting from injecting steam into ammonia-containing waters obtained in coke-oven plants in the conventional manner, are passed with combustion air below a gas generator, where ammonia is dissociated into nitrogen and hydrogen within the glowing coke. This process, however, depends on the presence of a gas generator plant, which has to be in permanent operation the year round. There exists the further drawback that a certain amount of nitrogen oxides may be formed.

A further process is known for burning ammonia formed in coke-oven plants; in that process, ammonia-containing waters are made to release ammonia in cloud form by a known expelling process, whereupon said ammonia is heated by the combustion of a fuel, the hot mixture being then passed through a zone of dissociation charged with a catalyst, and the hot gases leaving the dissociation zone being then completely burned by addition of more air. The last-mentioned process is dependent on the presence of a catalyst and requires operating above a certain limit temperature which is quite high, in order to avoid formation of nitrogen oxides.

Another known method operates by introducing ammonia clouds liberated from ammonia-containing waters by an expelling process as mentioned above into the heating gas for the coke-ovens. This method, however, has not found practical application in coke-oven plants because it is quite expensive and leads to considerable operational difficulties in the heating of coke-ovens due to the entrained steam. The condensates formed contain ammonia and have to be treated again. Sometimes damage is incurred to the heating equipment and the brick lining of the regenerators, or deposits of condensate may destroy the masonry in the chimney.

High expenses for steam are a disadvantage inherent in all known processes, since they operate by expelling ammonia from the ammonia-containing water. The expenses are further increased by the costs for the continuous operation of the expelling process.

In order to overcome these shortcomings, it has been suggested to remove ammonia and other harmful substances from the waters by treatment with gases. It has, for instance, been tried to inject air or waste gas into the ammonia-containing waters. However, in that manner, ammonia is only transported from the water into the air and that is contrary to existing regulations on air pollution.

Another known process is the injection of ammonia-containing water into smoke stacks. There, too, the only effect is the transfer of ammonia from the water into the air, whereby the latter is polluted so that the regulations are violated. In that case, too, the masonry will often be destroyed by the deposit of condensates in the chimney.

It is finally known to introduce ammonia-containing water mixed with cooling water, to which phosphates have been added, into a combined scrubbing and cooling unit for hot generator gas. In that case, however, only part of the ammonia is transmitted from the water into the gas, which gives off again part of the absorbed ammonia in a dry desulfuring process. The balance is finally burned with the generator gas below the ovens. However, the waste water discharged from the scrubber, still contains considerable amounts of ammonia and other harmful ingredients. This can only be considered a coarse cleaning of the ammonia-containing water. In accordance with existing regulations, such water cannot be discharged into the sewers.

It is the object of the present invention to provide a process for eliminating ammonia from the water accumulating in coke-oven plants, which is free of the drawbacks of the known processes.

More particularly, it is an object of the present invention to provide a process in which the formation of harmful nitrogen oxides can be safely avoided.

Other objects and advantages of the process of the present invention will become apparent from the detailed description hereinafter and illustrated by the accompanying drawing.

With the above objects in view, the invention consists of treating water resulting from the operation of coke ovens and containing ammonia with lean gas at such a temperature that the temperature of the water after the treatment will be at least 60° C. and that the lean gas containing the ammonia is conveyed to the regenerators of industrial furnaces and heated therein to such temperatures that ammonia will be dissociated to nitrogen and hydrogen, in a manner known per se.

While, as stated before, the problem of destroying ammonia resulting in the operation of coke-ovens has been experimented with for a long time, it had not been successfully dealt with before this invention was made, by which ammonia is removed in a simple manner without harmful byproducts (nitrogen oxides) being formed.

In the regenerators of industrial furnaces, among others, coke-ovens, the lean gas used for heating is usually heated to an appropriate temperature. In carrying out the proposed process, the ammonia contained in the heating gas is heated up to such temperatures, that it will be split into its components, nitrogen and hydrogen, by thermal dissociation, the formation of nitrogen oxides in the subsequent combustion being excluded.

In order to remove ammonia from the ammonia-containing water, it is necessary to carry out the treatment at elevated water temperatures. To raise the temperature of the ammonia-containing water at low cost, heat exchange can, for instance, be used with circulating wash water of vessels used in coke-oven plants. The lean gas used for heating purposes may also be pre-heated. This may, e.g., be done in blast furnace gas by controlled cooling of the gas upon emergence from the furnace or by heating the gas in a recuperator. Heating of the blast furnace gas may also be performed by part combustion or by mixing other gases for combustion therewith. It is desirable to insulate the scrubber in order to avoid losses of heat by dissipation.

In the following, the invention will be more fully described in an example, but it should be understood that this is given by way of illustration and not of limitation, and that many changes and modifications in the details can be made without departing from the spirit of the invention.

EXAMPLE

In a coke-oven plant having a throughput of 2800 t. per day of coal, 25 m.$^3$ per hour of condensates and ammonia-containing wash waters are obtained in the indirect byproduct recovery process; as a rule, these are worked up in an expelling unit. The ammonia-containing water to be treated has about the following composition:

|  | G. per liter |
|---|---|
| Free ammonia | 11.0 |
| $H_2S$ | 3.5 |
| Cyanogen | 0.9 |

This water is treated, for instance, according to the invention by the following process.

The ammonia-containing water is pre-heated to about 50° C. by heat exchange with rinsing water of the vessels of the plant, and is then charged to the head of a scrubber insulated against heat losses, where it is treated in counter current with lean gas heated up to such a temperature that the discharged water will have a temperature of about 70° C. The discharge from the scrubber contains

|  | G./liter |
|---|---|
| Ammonia | 0.03 |
| $H_2S$ | 0.02 |
| Cyanogen | <0.05 |

The ammonia-containing lean gas is passed to the regenerators of a coke battery and heated there to about 1200° C., a temperature at which ammonia is completely dissociated into nitrogen and hydrogen.

It is important that the water after treatment in the scrubber has a temperature of at least 60° C., because only at such elevated temperatures is it safe to assume that ammonia has been sufficiently expelled from the water.

It can be noted that the water discharged from the scrubber contains ammonia and other harmful substances in such low amounts as can be achieved in conventional expelling processes only under favorable conditions and at much higher costs.

It is therefore possible, by the process of the invention, to remove ammonia almost completely from the ammonia-containing waters of coke-oven plants in a simple manner and at low expenses. Furthermore, in the water so treated, the contents in hydrogen sulfide and other harmful substances (cyanogen, thiocyanates) is likewise so low that the water will be entirely safe.

When the specifications as to purity of the water resulting from a treatment are especially strict, it is desirable to treat the water with lean gas in two stages serially connected, in such a manner that the main stream of the gas is admitted to the first stage, while a partial stream, which is of a considerably higher temperature, is introduced into the second stage. By these measures it is accomplished to decrease the amount of ammonia in the treated water to a further extent. It is another advantage that the energy consumption for expelling the ammonia from the water is comparatively low.

It has, moreover, proved useful to heat up the ammonia-containing lean gas, since a corrosion of the gas pipes leading to the regenerators will thus be avoided.

In case the specifications for the purity of the water to be discharged are extremely high, it may be advantageous to subject the water to an after-treatment by biochemical methods in a waste water pool, after it has been treated in accordance with the invention.

The mode of operation of the process according to the invention will now be illustrated in the accompanying drawing, the sole figure of which schematically shows one embodiment of the apparatus for carrying out the process.

In the drawing, a scrubber is designated by 10; a pipe B empties into the scrubber for admitting water to be treated over a valve 19, while it is in open position; a pipe A is provided for admitting lean gas to the scrubber (from a source not shown). A regenerator 15 which may, for instance, form part of a coke-oven plant, is connected to the scrubber by a pipe 20. Lean ammonia-containing gas passes through pipe 20 into the regenerator 15, where it is heated to a high temperature at which dissociation of ammonia into nitrogen and hydrogen will occur. The heated gases escaping from the regenerator may pass, for instance, into the heating system of a coke battery (not shown).

The water is passed from scrubber 10, where it has been freed from ammonia to a large exent over pipe 22 to a high-power washer 12, where it is treated with lean gas of elevated temperature. For that purpose, a part of the lean gas arriving through pipe A branched off, and is conveyed by pipe 24 over a regulator 17, and from there by pipe 26 and through a heating device 13, arriving at the high-power washer 12 by way of pipe 28 at a temperature of 400° C., to which it was raised in heater 13. The lean ammonia-containing gas leaving the high-power washer 12 is fed over pipe 30 to a regulator 18 and from therethrough pipe 32 to scrubber 10. Water discharged from high-power washer 12 is made to pass through a heat exchanger 14 by way of a pipe 34, through which it leaves te heat exchanger in order to discharge directly into the sewers, with a valve 40 closed; or, when further purification is desired, it will be fed, with valve 40 open, to a waste water purification pool 16.

While it is possible to feed water directly to scrubber 10, from pipe B through valve 19 in open position, it is preferable to lead the water with valve 19 closed, over pipe 36 to the heat exchanger 14, where it is pre-heated and then passed over pipe 38 to scrubber 10. This mode of operation is more economical since it utilizes to full extent the heat generated in heater 13.

In order to avoid corrosion in the gas pipes arranged between scrubber 10 and regenerator 15, the lean gas charged with ammonia is heated. For this purpose, a partial current of heating gas is conveyed to line 20 by way of a line 42 branched off from line 28.

It will be understood, of course, that the embodiment of the apparatus shown and described is only an example, which is not intended to limit the scope of the invention, however, it is intended to cover all changes and modifications of the example described and the apparatus for carrying out the process of the invention which do not constitute departures from the spirit and scope of the invention as set forth in the appended claims.

What is claimed is:

1. A process for destroying ammonia contained in waters resulting from the operation of coke-ovens, wherein ammonia is expelled by gas from the water, said process comprising the steps of heating the water to be treated, with lean gas at an elevated temperature of such a degree that the temperature of the water after treatment thereof is at least 60° C., conveying the lean gas charged with ammonia to regenerators of the coke-ovens, and heating the same therein to such a temperature that the ammonia will become dissociated to nitrogen and hydrogen without formation of harmful nitrogen oxides.

2. The process, according to claim 1, wherein the temperature to which the gas is heated in the regenerators is about 1200° C.

3. The process, according to claim 1, wherein the temperature of the water under treatment is raised to about 70° C.

4. The process, according to claim 1, which comprises treating the ammonia-containing water with lean gas in two serially connected stages, with two separate streams of said gas, whereby the main stream of lean gas is passed into the first stage and a partial stream of lean gas, at considerably higher temperature, is led into the second stage.

5. The process, according to claim 1, wherein the ammonia-containing water to be treated is pre-heated by heat exchange with rinsing water from the vessels used in the coke-oven plant or by water already treated before its discharge into sewers.

6. The process, according to claim 1, wherein the ammonia-containing lean gas is subjected to over-heating before it is passed to dissociation.

References Cited

UNITED STATES PATENTS

| | | | |
|---|---|---|---|
| 3,292,345 | 12/1966 | Wunderlich et al. | 55—46 |
| 1,880,841 | 10/1932 | Curs | 23—193 X |
| 2,070,620 | 2/1937 | Price | 23—3 |
| 2,884,304 | 4/1959 | Grosskinsky et al. | 23—3 |
| 3,451,896 | 6/1969 | Schon | 23—220 X |

FOREIGN PATENTS 804,544 11/1958 Great Britain.

MICHAEL E. ROGERS, Primary Examiner

U.S. Cl. X.R.

23—3; 55—70; 210—15